Patented July 13, 1954

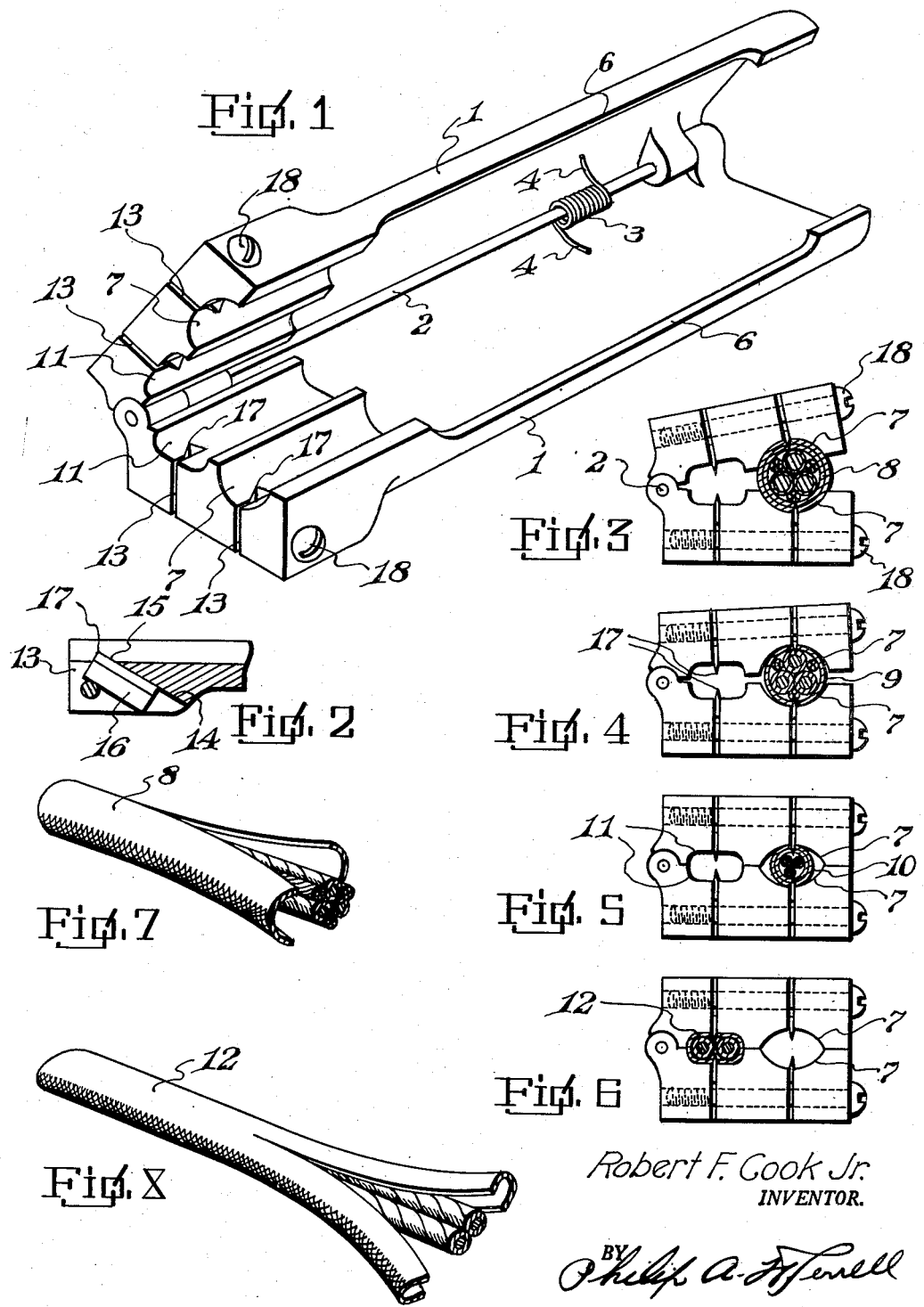

2,683,308

UNITED STATES PATENT OFFICE 2,683,308

SLITTER FOR ELECTRIC WIRE CONDUCTORS

Robert F. Cook, Jr., Tulsa, Okla.

Application February 2, 1951, Serial No. 209,140

1 Claim. (Cl. 30—91)

The invention relates to slitters for slitting sheaths on wires of the electric conductor type, and has for its object to provide a device of this kind comprising hingedly connected members having registering grooves, in which grooves is gripped the sheathed conductor wire to be slit, and blades in said grooves for severing the sheathing longitudinally, as the wire is pulled from the slitter while the slitter is gripped by the operator.

A further object is to dispose the cutting blades angularly in kerfs in the ends of the hingedly connected members, and to grip said blades by screws extending transversely through the hinged sections and through the kerfs.

A further object is to dispose the clamping screws where they will engage the backs of the cutting blades adjacent their inner ends for taking up the thrust on the blades during a wire stripping operation.

A further object is to provide a slitter which will accommodate different size cables and types of cables.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the slitter showing the slitter open.

Figure 2 is a vertical longitudinal sectional view through one of the kerfs.

Figure 3 is an end view showing the larger size cable.

Figure 4 is a view similar to Figure 3 showing an intermediate size cable to be slit.

Figure 5 is a view similar to Figure 3, showing the smallest size cable to be slit.

Figure 6 is a view similar to Figure 3, but showing a different shape cable, or off-round, to be slit.

Figure 7 is a perspective view of one end of a cable, showing the cable slit.

Figure 8 is a perspective view of a flat type of cable, showing the cable slit.

Referring to the drawing, the numeral 1 designates hingedly connected members, the members being hingedly connected on a longitudinal rod 2 is at one side of the device. Surrounding the rod 2 a torsion spring 3, the ends 4 of which normally hold the device in open position as shown in Figure 1. Members 1 are formed with their inner sides longitudinally chambered and the free edges of the members are longitudinally recessed, as shown at 6, to form a sight opening when the device is closed, and through which opening, the length of wire may be observed before a slitting operation.

Members 1, at one end thereof, are provided with semi-circular channels 7, registering with each other, when the members are brought together, as shown in Figures 3 to 6. Channels 7 are made large enough for the largest size cable 8, hence they will receive the intermediate size 9 and the smallest size 10. Members 1 are also provided with rectangular channels 11 for receiving cables 12, of the flat type, shown in Figures 6 and 8.

The channeled ends of the members 1 are longitudinally kerfed on the centers of the channels, at 13, and these channels or kerfs form an acute angle shoulder 14 in the bottom of each kerf, and against which shoulders the cutting edge 15 of the cutting blades 16 engage. It will be noted that the blades 16 have one of their corners 17 disposed within the bottom of each channel, so that there will be a cutting or shearing action on the cable cover when the cable is gripped between the members 1 and is pulled from the device. Extending transversely through the channeled ends of the members 1 and through all of the kerfs 13 are clamping bolts 18. When the bolts 18 are tightened all of the blades 16 are gripped by the sides of the kerfs, thereby preventing displacement of the blades. The non-cutting edges of the blades, adjacent their upper ends, referring to Figure 2, engage the clamping bolts 18, hence the bolts receive all of the thrust during the cutting operation.

In use, the end of a conductor wire is placed in the device for the desired length, then the device is closed and gripped in closed position by the operator. The operator can observe through the sight opening that there has been no displacement. Following, the operators grasps the conductor wire and pulls outwardly thereon, or hold the wire and pulls outwardly on the slitter for the slitting operation.

From the above it will be seen that a conductor wire slitter is provided which is simple in operation, the parts reduced to a minimum, and one wherein standard sizes of conductor wires may be slit, whether round in cross section or off-round.

The invention having been set forth what is claimed as new and useful is:

A slitter for slitting longitudinally a sheath on a wire, said slitter comprising elongated members, said elongated members being hingedly connected along one of their longitudinal edges, the inner sides of said elongated members being longitudinally chambered, said chambers being positioned to register with each other when the elongated members are hingedly moved to closed engaging positions against each other thereby forming a passage through which a sheathed wire may be pulled, a kerf extending into the ends of the elongated members and into the outer ends of the chambers, said kerfs having their bottoms at acute angles to the bottoms of the chambers and diverging rearwardly and outwardly in relation to each other, oblong blades in said kerfs, said blades having their cutting edges engaging the acutely angled bottoms of the kerfs and one of their corners extending into the chambers, bolts extending through the kerf ends of the elongated members and kerfs and engaging the outer edges of the blades opposite their cutting edges and adjacent their outer ends, said bolts forming stops against outward movement of outer ends of the blades and also means for contracting the kerfs and gripping the blades between the sides of the kerfs.

References Cited in the file of this patent

UNITED STATES PATENTS

| Number | Name | Date |
|---|---|---|
| 572,808 | Killian | Dec. 8, 1896 |
| 756,857 | Hutchings | Apr. 12, 1904 |
| 1,686,044 | Stott | Oct. 2, 1928 |
| 1,739,972 | Klinger | Dec. 17, 1929 |
| 1,939,574 | Saylor | Dec. 12, 1933 |
| 2,089,774 | Wachstein | Aug. 10, 1937 |
| 2,120,398 | Edwards | June 14, 1938 |
| 2,373,868 | Wilson | Apr. 17, 1945 |
| 2,536,230 | Sheppard | Jan. 2, 1951 |